United States Patent
Bhattacharya

(10) Patent No.: US 9,268,944 B2
(45) Date of Patent: Feb. 23, 2016

(54) SYSTEM AND METHOD FOR SAMPLING BASED SOURCE CODE SECURITY AUDIT

(71) Applicant: Wipro Limited, Bangalore (IN)

(72) Inventor: Sourav Sam Bhattacharya, Fountain Hills, AZ (US)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 14/176,516

(22) Filed: Feb. 10, 2014

(65) Prior Publication Data

US 2015/0227745 A1    Aug. 13, 2015

(51) Int. Cl.
*G06F 21/57*    (2013.01)

(52) U.S. Cl.
CPC ........ *G06F 21/577* (2013.01); *G06F 2221/033* (2013.01)

(58) Field of Classification Search
None
See application file for complete search history.

(56) References Cited

U.S. PATENT DOCUMENTS

| 8,086,483 | B1* | 12/2011 | Yuan et al. ............ 705/7.39 |
| 2007/0157311 | A1* | 7/2007 | Meier et al. ............ 726/22 |
| 2009/0210854 | A1 | 8/2009 | Carteri et al. |
| 2010/0115601 | A1* | 5/2010 | Brandstetter et al. ........ 726/11 |

OTHER PUBLICATIONS

OWASP, retrieved at https://www.owasp.org/index.php/Category:OWASP_Top_Ten_Project on Feb. 10, 2014.

* cited by examiner

*Primary Examiner* — David Pearson
(74) *Attorney, Agent, or Firm* — LeClairRyan, a Professional Corporation

(57) ABSTRACT

This disclosure relates to methods and systems for performing software security audit for an executable code, the method comprising: receiving, by a hardware processor, the executable code along with a plurality of life-cycle artifacts associated with the executable code; performing a security assessment on the executable code and the plurality of life-cycle artifacts associated with the executable code to identify one or more potential security issues associated with the executable code; determining a first set of questions based on the identified one or more security issues associated with the executable code; determining a second set of questions based on a requirements specification associated with the executable code; and performing a security audit session with one or more audit participants based on the first set of questions and the second set of questions.

15 Claims, 6 Drawing Sheets

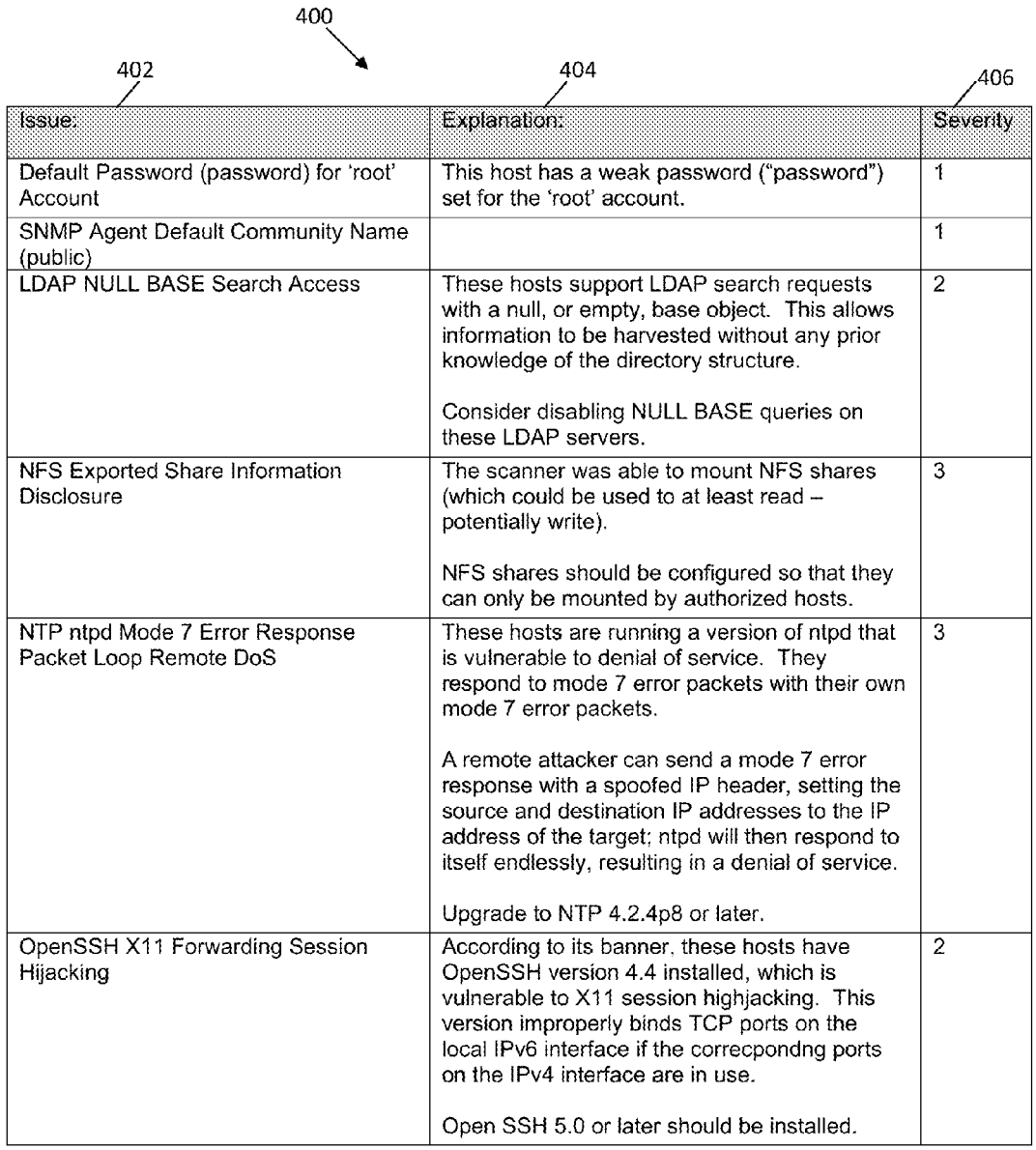

| Issue: | Explanation: | Severity |
|---|---|---|
| Default Password (password) for 'root' Account | This host has a weak password ("password") set for the 'root' account. | 1 |
| SNMP Agent Default Community Name (public) | | 1 |
| LDAP NULL BASE Search Access | These hosts support LDAP search requests with a null, or empty, base object. This allows information to be harvested without any prior knowledge of the directory structure.<br><br>Consider disabling NULL BASE queries on these LDAP servers. | 2 |
| NFS Exported Share Information Disclosure | The scanner was able to mount NFS shares (which could be used to at least read – potentially write).<br><br>NFS shares should be configured so that they can only be mounted by authorized hosts. | 3 |
| NTP ntpd Mode 7 Error Response Packet Loop Remote DoS | These hosts are running a version of ntpd that is vulnerable to denial of service. They respond to mode 7 error packets with their own mode 7 error packets.<br><br>A remote attacker can send a mode 7 error response with a spoofed IP header, setting the source and destination IP addresses to the IP address of the target; ntpd will then respond to itself endlessly, resulting in a denial of service.<br><br>Upgrade to NTP 4.2.4p8 or later. | 3 |
| OpenSSH X11 Forwarding Session Hijacking | According to its banner, these hosts have OpenSSH version 4.4 installed, which is vulnerable to X11 session highjacking. This version improperly binds TCP ports on the local IPv6 interface if the correcpondng ports on the IPv4 interface are in use.<br><br>Open SSH 5.0 or later should be installed. | 2 |

FIG. 4

SYSTEM AND METHOD FOR SAMPLING BASED SOURCE CODE SECURITY AUDIT

FIELD OF THE INVENTION

This disclosure relates generally to software security analysis, and more particularly to methods and systems for performing security audit for an executable code.

BACKGROUND OF THE INVENTION

In a software solution deal between two stakeholders, one stakeholder (e.g. a software solutions customer) acquires developed software from a second stakeholder (e.g. a software solutions vendor). However, many a times, the vendor may disallow access to a source code of a software product and share only the binary/executable version of the software product. The customer may want to find any security threats associated with the software before deploying it. Existing security analysis techniques include finding possible security threats by analyzing the source code. If the source code is not available, an executable version of the software may be reverse engineered to write a speculated version of the source code according to existing security analysis techniques. The outcome of security analysis of the reverse engineered code may deviate from the actual security issues associated with the source code because the reverse engineered code may not be an exact replica of the source code.

The security analysis of the reverse engineered code may indicate broad level security aspects such as the source code is functionally correct or the software is performing appropriately etc. However, security analysis of the reverse engineered code may not be able to indicate all the actual possible security threats associated with the source code. For example, the source code may have been written in a non-secure way thus making it non-compliant with some security standards. Here, although the security analysis of the reverse engineered code may indicate that the reverse engineered code is functionally correct, it may not indicate all the specific security issues associated with the source code. This makes the software vulnerable to security threats when deployed.

Therefore, there is a need for a security analysis technique that accurately performs the security analysis of a software product when the source code is not available.

The present invention is directed to overcoming these and other deficiencies in the art.

SUMMARY OF THE INVENTION

In one embodiment, a method for performing security audit for an executable code is disclosed, the method comprising: receiving, by a hardware processor, the executable code along with a plurality of life-cycle artifacts associated with the executable code; performing a security assessment on the executable code and the plurality of life-cycle artifacts associated with the executable code to identify one or more potential security issues associated with the executable code; determining a first set of questions based on the identified one or more security issues associated with the executable code; determining a second set of questions based on a requirements specification associated with the executable code; and performing a security audit session with one or more audit participants based on the first set of questions and the second set of questions.

In one embodiment, a security audit apparatus for performing security audit for an executable code is disclosed, the apparatus comprising: at least one hardware processor; and a memory comprising instructions executable by the at least one hardware processor, the instructions when executed, cause the at least one hardware processor to: receive the executable code along with a plurality of life-cycle artifacts associated with the executable code; perform a security assessment on the executable code and the plurality of life-cycle artifacts associated with the executable code to identify one or more potential security issues associated with the executable code; determine a first set of questions based on the identified one or more security issues associated with the executable code; determine a second set of questions based on a requirements specification associated with the executable code; and perform a security audit session with one or more audit participants based on the first set of questions and the second set of questions.

In one embodiment, a non-transitory computer readable medium storing computer executable instructions thereon, which when executed by a hardware processor, cause the hardware processor to perform operations comprising: receiving, by a hardware processor, an executable code along with a plurality of life-cycle artifacts associated with the executable code; performing a security assessment on the executable code and the plurality of life-cycle artifacts associated with the executable code to identify one or more potential security issues associated with the executable code; determining a first set of questions based on the identified one or more security issues associated with the executable code; determining a second set of questions based on a requirements specification associated with the executable code; and performing a security audit session with one or more audit participants based on the first set of questions and the second set of questions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2, 4, and 5 illustrate exemplary security assessment reports based on various life-cycle artifacts in accordance with some embodiments.

DETAILED DESCRIPTION OF THE INVENTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
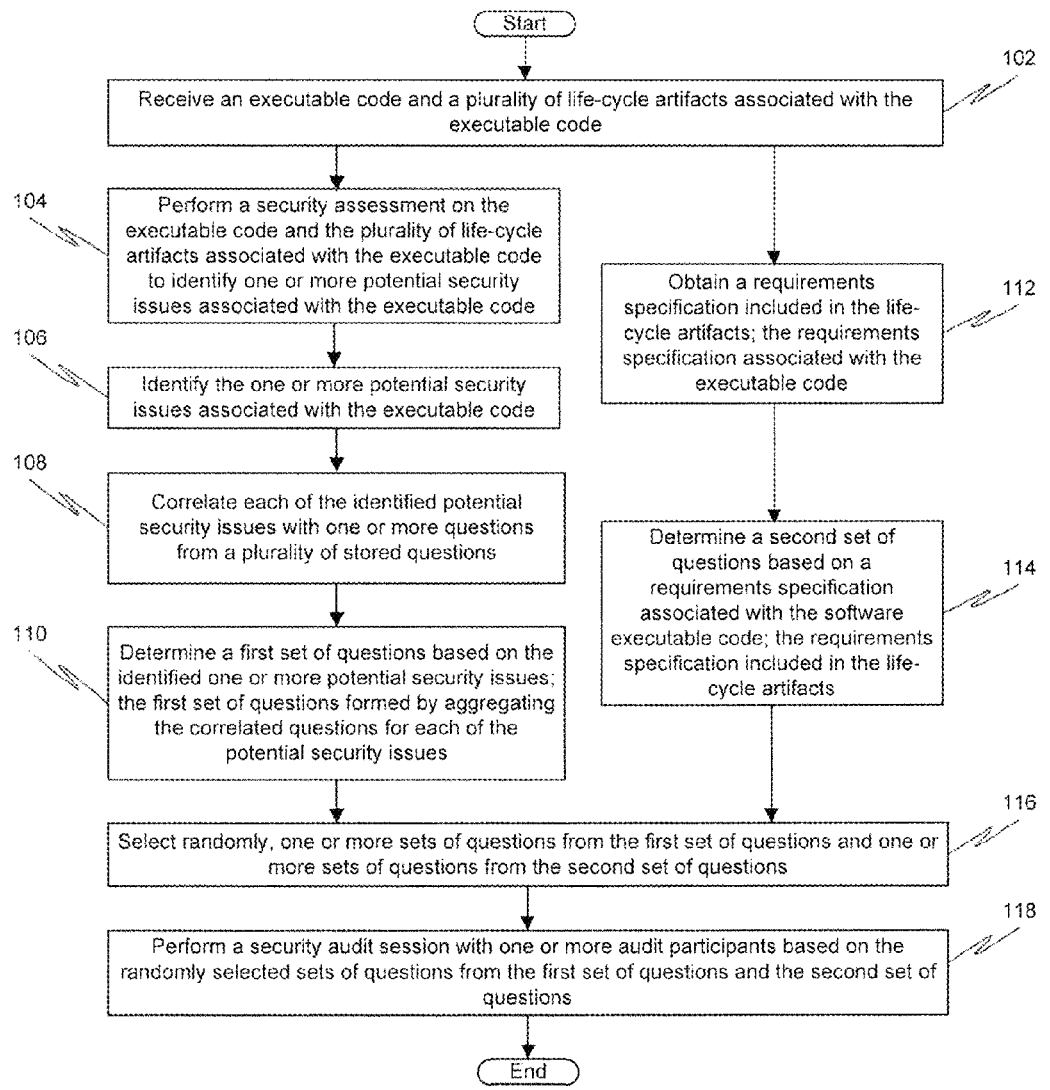
FIGS. 1A, 1B, and 1C illustrate a flowchart for performing a software security audit in accordance with some embodiments.

FIG. 1 illustrates a flowchart for performing a software security audit in accordance with some embodiments. In accordance with the embodiments of this disclosure, a stakeholder such as a software solutions vendor, for example, may provide a software product to another stakeholder such as a software solutions customer in the form of an executable or a binary code. It should be understood by a person skilled in the art that a software solutions customer may include a software user, an organization, or any similar entity that is associated with the software industry. Here, an executable code may include an encoded file that is machine understandable and causes a computing machine to perform tasks indicated by instructions included in the encoded file. An executable code may include any of the known executable file extensions such as *.exe (executable), *bat (batch), *.jar (Java archive), *.apk (application package file), *ipa (iPhone application archive, .dll (dynamic-link library) and other known file executable extensions including but not limited to:

.8BF files—plugins for some photo editing programs including Adobe Photoshop, Paint Shop Pro, GIMP and Helicon Filter.

.a—static library a.out—(no suffix for executable image, .o for object files, .so for shared object files) classic UNIX object format, now often superseded by ELF APP—apple application program executable file. Another form of zip file.

BAC—an executable image for the RSTS/E system, created using the BASIC-PLUS COMPILE command[3]

BPL—a Win32 PE file created with Borland Delphi or C++Builder containing a package.

Bundle—a Macintosh plugin created with Xcode or make which holds executable code, data files, and folders for that code.

.Class—used in Java

COFF (no suffix for executable image, .o for object files)—UNIX Common Object File Format, now often superseded by ELF COM files—commands used in DOS DCU—Delphi compiled unit DOL—the file format used by the Gamecube and Wii, short for Dolphin the codename of the Gamecube.

.EAR—archives of Java enterprise applications

ELF—(no suffix for executable image, .o for object files, .so for shared object files) used in many modern Unix and Unix-like systems, including Solaris, other System V Release 4 derivatives, Linux, and BSD)

expander (see bundle)

DOS executable (.exe—used in DOS)

.IPA—apple IOS application executable file. Another form of zip file.

.JAR—archives of Java class files

.XPI—PKZIP archive that can be run by Mozilla web browsers to install software)

Mach-O—(no suffix for executable image, .o for object files, .dylib and .bundle for shared object files) Mach based systems, notably native format of Mac OS X)

NetWare Loadable Module (.NLM)—the native 32-bit binaries compiled for Novell's NetWare Operating System (versions 3 and newer)

New Executable (.EXE—used in DOS 4.0 and later, 16-bit Microsoft Windows, and OS/2)

.o—un-linked object files directly from the compiler.

Portable Executable (.EXE, .DLL—used in Microsoft Windows and some other systems)

Preferred Executable Format—(Mac OS versions 9 and earlier; compatible with Mac OS X via the Classic emulator)

.s1es—Executable used for S1ES learning system.

.so—shared library, typically ELF

Value Added Process (.VAP)—the native 16-bit binaries compiled for Novell's NetWare Operating System (version 2, NetWare 286, Advanced NetWare, etc.)

.WAR—archives of Java Web applications

XBE—Xbox executable

XCOFF—(no suffix for executable image, .o for object files, .a for shared object files) extended COFF, used in AIX XEX—Xbox 360 executable .VBX—Visual Basic extensions .OCX—Object Control extensions TLB—Windows Type Library For purposes of this disclosure, an executable code is different from a source code in the sense that source code includes instructions that are human written and human readable instructions but a an executable code includes instructions that are not human readable but encoded in such a way that a computing machine is able to understand them to perform the indicated tasks.

In step 102, a security audit apparatus associated with the software solutions vendor may receive the binary/executable code along with a plurality of life-cycle artifacts associated with the executable code. It should be understood by a person skilled in the art that the terms binary and executable are used interchangeably in this disclosure in the context of an executable code. Further, because of various intellectual property considerations or other contractual considerations, the software solutions vendor may restrict complete or partial access, for the software solutions customer, to a source code associated with the software product. In lieu of the source code, the software solutions vendor, may however, provide various life-cycle artifacts associated with the executable code of the software product along with the executable code.

The life-cycle artifacts may include information associated with various software development life-cycle (SDLC) stages of the software product. In some embodiments, the life-cycle artifacts may include various documents (reports, logs, or lists) prepared by the software solutions vendor during various SDLC stages such as design, coding, unit testing, penetration testing, and network analysis. These documents may include a list of strategies used in coding, design details for the executable code such as object oriented design, implementation details, or inheritance description etc., a list of functionalities and their interdependence, performance logs associated with the software application during various testing stages, testing reports associated with each stage of testing during the SDLC, unit tests results, systems integration test (SIT) results, user-acceptance test (UAT) results, and requirements specifications associated with the executable code. Here, the software solutions vendor may produce may produce one or more life-cycle artifacts at each stage in the SDLC and may subsequently, provide all these life-cycle artifacts to the software solutions customer along with the executable code.

In step 104, a processor in communication with the security audit apparatus may perform a security assessment on the executable code and the plurality of life-cycle artifacts associated with the executable code. This security assessment may be performed to identify one or more potential security issues associated with the executable code. In some embodiments, the security assessment may include determining any potential security threats that the executable code may be vulnerable to. These security threats may arise due to inappropriate coding strategies by software developers, improper software testing by a software tester, and lack of security measures to protect the executable code from security threats etc.

In some embodiments, the processor may perform the security assessment of the executable code prior to the security assessment of life-cycle artifacts associated with the executable code. Regardless, the embodiments of this disclosure allow the processor to perform the security assessment of the executable code and life-cycle artifacts in any order and are not limited to only one order. In performing the security assessment on the executable code, the processor may test the executable code to analyze the functioning of the executable code and determine whether the executable code is functioning appropriately. The processor may further determine whether there is any potential security threat to the functioning of the executable code that may affect the functioning at the time of deployment or before deployment of the executable code. In case the processor determines any potential security issue with the functionality, the processor may prepare one or more security assessment reports listing out any potential security issues encountered in the security assessment of the executable code. In an exemplary scenario, the processor may perform sequel injection on the executable code and determine one or more potential security issues to the executable code. The processor may then prepare a list of such security threats.

Additionally, the processor may perform security assessment on each of the life-cycle artifacts to determine possible security threats associated with the executable code. In some embodiments, the processor may require an input from a user indicating information included in an artifact. This may be because the artifact may not be machine readable. For example, a unit testing artifact received from the software solutions vendor may include performance parameters associated with the executable code in a handwritten document which is not machine understandable. Here, a user may manually provide values of these performance parameters to the processor in a machine readable format. In some embodiments, however, the life-cycle artifacts may be machine understandable and the processor may automatically perform the security assessment on these artifacts without any manual input for providing the contents of the life-cycle artifacts to the processor.

In an exemplary scenario, the processor may perform security assessment on life-cycle artifacts associated with a various SDLC stages such as requirements cycle, design cycle, a unit testing cycle, a penetration testing cycle, and a network vulnerability analysis cycle of the executable code. The security assessment may be performed to determine potential security issues associated with each of these life-cycles.

Referring back to FIG. 1A, in step 106, the processor may, based on the security assessment, identify one or more possible security threats associated with each of the stages of the SDLC for the executable code. Some possible security threats may include, but not limited to, injection flaw, broken authentication and session management, cross site scripting, insecure direct object references, security misconfiguration, sensitive data exposure, missing function level access control, cross site request forgery, usage of components with known vulnerabilities, invalidated redirects and forwards, auto browser attacks, man-in-the-middle attacks etc. In some embodiments, once the possible security threats are identified by performing the security assessment on the executable code and the associated life-cycle artifacts, the processor may aggregate the identified possible security threats and prepare a security assessment report that indicates potential security issues associated with the executable code.

Figure 2:
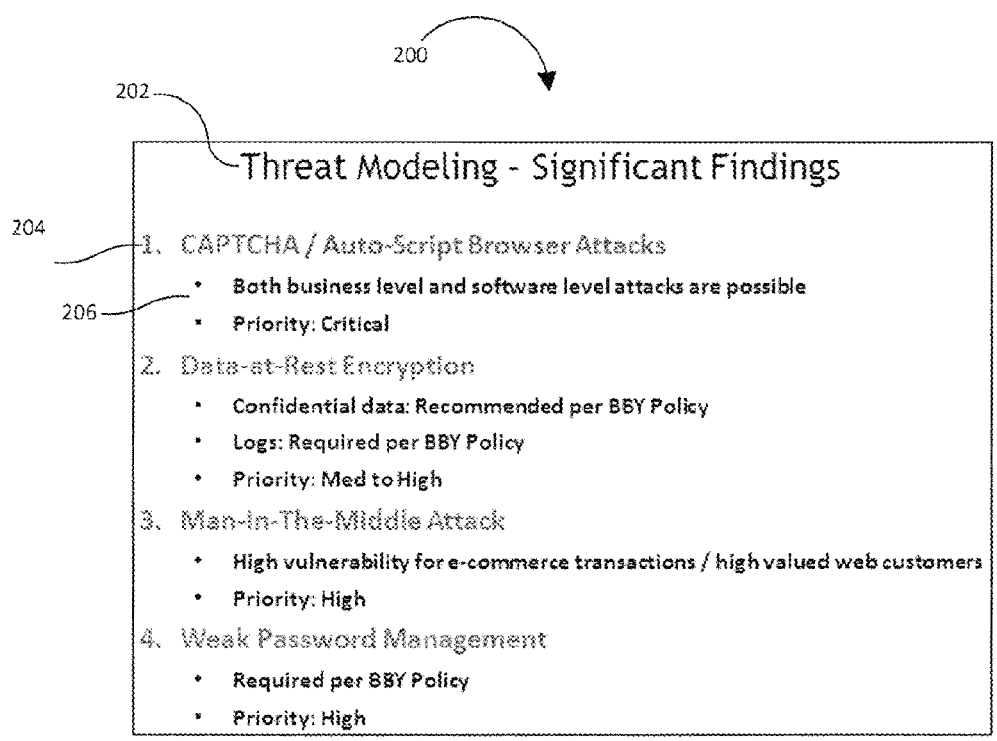

FIG. 2 illustrates an exemplary security assessment report 200 that is prepared by the software solutions customer (manually or automatically) on performing the security assessment on design artifacts provided with the executable code. The design artifacts may include design details, implementation details, and/or environmental details associated with the executable code. In some embodiments, the processor may prepare security assessment report 200 that includes a context heading 202, a list of potential security issues 204 (e.g., Captcha attacks, man-in-the-middle attacks etc.) that are determined based on the security assessment on design artifacts, and details 206 associated with potential security issues 204. It should be apparent to a person skilled in the art that a security assessment report is not limited to the above example and may include other types of reports such as graphical reports, lists, spreadsheets, or any known visual representations. Further, security assessment reports may also be prepared for other life-cycle artifacts in a similar manner, by the processor or by a user on performing the security assessment.

Figure 5:
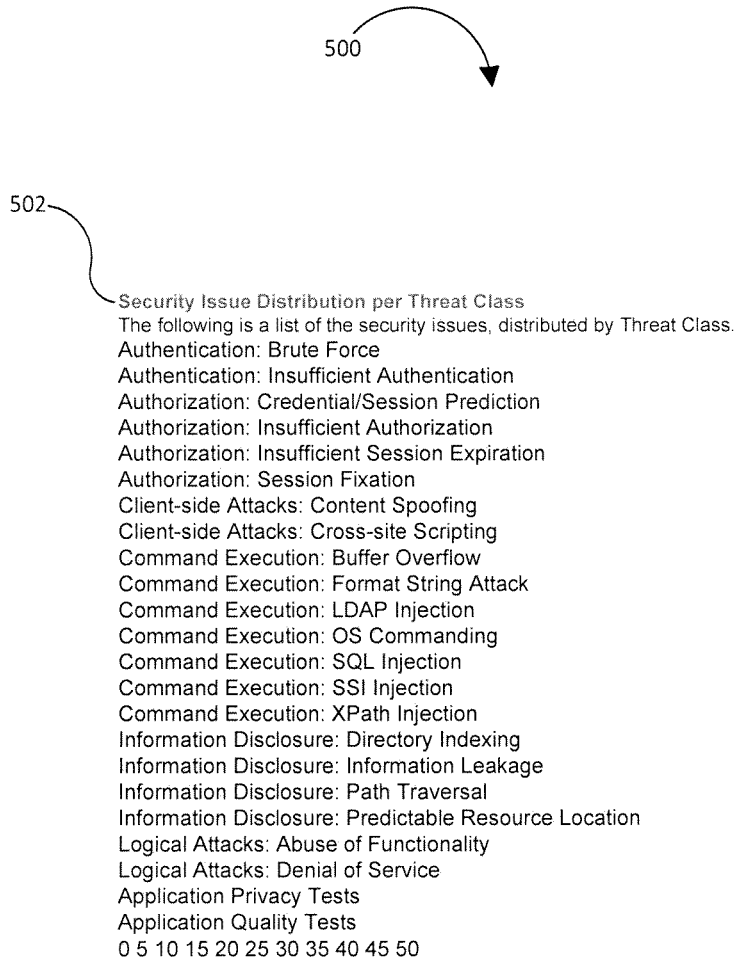

Similarly, FIG. 4 illustrates another exemplary security assessment report such as security assessment report 200 that is produced as a result of penetration testing. This report indicates an issue 402 which includes one or more identified potential security issues. This report may further indicate an explanation 404 for an issue 402 and a severity 406. Another exemplary security assessment report such as security assessment report 500 is illustrated in FIG. 5. This report may also be produced as a result of the penetration testing phase. This report indicates security issue distribution per threat class 502. This distribution may indicate a classification of all the identified potential security issues according to various threat classes.

Further, in step 108, the processor may correlate each of the identified potential security issues with one or more questions from a plurality of stored questions in a repository. In some embodiments, the repository may include an industry standard library of known security issues. This library may be published and include a large number of known security issues. Here, each security issue may be mapped to a set of questions that are also included in the library. Referring to step 108, the processor may correlate each of the potential security issues identified in step 106 to a set of questions from the library. This may include looking up for an identified possible security issue in the library and then looking up for the set of questions in the library that correspond to that identified potential security issue. The processor may thus determine a set of questions associated with each of the identified potential security issues. For the purposes of illustration and not to be limiting, example questions for an identified potential security risk may be as follows:

Security Issue: SQL InjectionKnowledge challenge questions:
  i. If the programming language is Java, do you ever use the PreparedStatement( ) construct ?
  ii. Do you directly pass an input variable to a database SQL query?

In step 110, the processor may aggregate all such sets of questions to create a first set of questions. In some embodiments, the first set of questions may be referred to as a "core question set" and includes an aggregation of all the questions that were correlated to various identified potential security issues. Once the first set of questions is created, the processor may store it in a memory that is in communication with the security audit apparatus.

In step 112, the processor may obtain a requirements specification associated with the executable code. This requirements specification may be obtained from the life-cycle artifacts that were initially provided by the software solutions vendor along with the executable code. The requirements specification may include one or more requirements to develop the executable code. For example, the requirements specification may include a purpose of the executable code, design or implementation requirements, operational requirements, functionality of the executable code, user interface requirements associated with the executable code etc. It should be understood by a person skilled in the art, however, that the contents of the requirements specification are not limited to the mentioned requirements and can include any requirement as specified by software solutions customer. The requirements specification may have been prepared by the software solutions vendor after discussing and finalizing detailed requirements for developing the executable code with the software solutions vendor.

Once the requirements specification is obtained, the processor may determine a second set of questions based on the requirements specification, in step 114. In some embodiments, this set of questions may be referred to as a "functional question set." The processor may determine this set of questions from another stored set of functional questions in an internal database. This database may store a mapping between various requirements and a large number of various questions. For example, a functional requirement may be mapped to a set of questions about the functionality of a software application or an executable code, a design requirement may be mapped to a set of questions based on design of an application, a requirement regarding developing a source code may be mapped to questions based on coding strategies and so on. An example functional requirement may be if the user provides a valid login ID and password, the system shall allow the user to login and access his/her account. This requirement, if stated in a machine readable format (in an artifact) such as a spreadsheet, can be automatically processed by the processor which re-states by reverting the functional requirement and seeks a Yes/No answer. In this case, the re-stated question shall be "if the User provided a valid login ID and password, will the system allow access his/her account" with an answer to be selected from Yes or No. The processor may match a requirement from the requirements specification to one or more questions corresponding to that requirement from the database.

In step 116, the processor may select randomly, one or more sets of questions from the first set of questions and one or more sets of questions from the second set of questions. In some embodiments, the number of sets selected from each of the core question set and the functional question set may be equal to the number of audit participants to whom the questions would be provided at a later stage. For example, if there are 5 audit participants, the processor may randomly select 5 sets of questions having 3, 5, 8, 4, and 6 questions respectively from the core question set. Further, the processor may randomly select 5 sets of questions having 3, 8, 6, 4, and 9 questions from the functional question set, respectively.

In some embodiments, the processor, while selecting the sets of questions, may include a question in more than one set. Thus, two or more sets of questions may have partial overlap in the questions that are included in those sets. For example, two sets of questions having 4 questions each may include two questions that are same in both the sets. The other two questions in both the sets may be different from each other in this scenario. It should be apparent, however, that it is not necessary for this disclosure to have an overlap between two or more sets of questions. Some embodiments of this disclosure also allow a selected set of questions to include questions that are entirely distinct from the questions included in other selected sets of questions.

Further, in step 118, the processor may perform a security audit session with one or more audit participants based on the randomly selected set of questions from the first set of questions and the selected set of questions from the second set of questions. Here, the audit participants may be software developers and/or software testers who have developed and/or tested the source code and the executable code. These software developers may be associated with the software solutions vendor either by way of employment or as a third party hired for developing/testing the source code and the executable code. In some embodiments, performing an audit session may include conducting an online computer-based examination for the one or more audit participants in which the randomly selected questions are presented to the audit participants. Each participant may enter an answer corresponding to each question presented to that participant. Subsequently, the processor may evaluate the inputs from each audit participant.

Figure 1B:
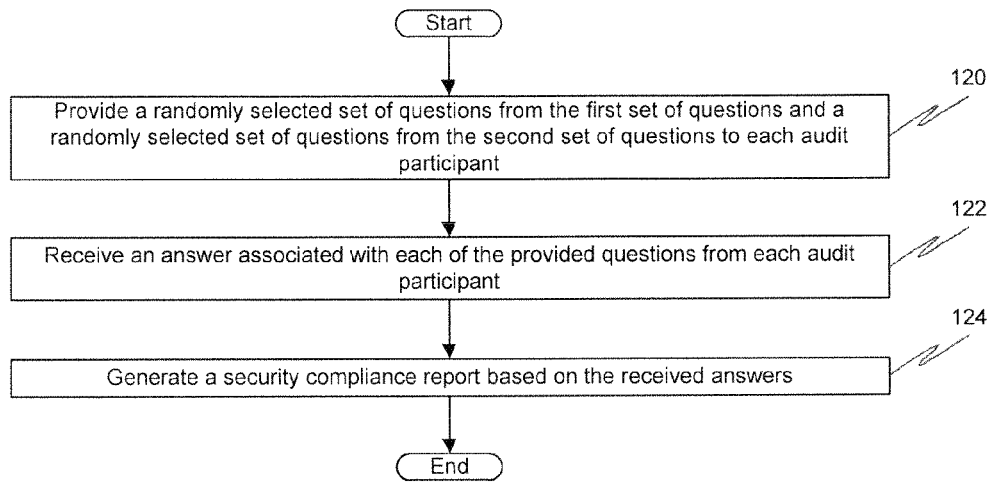
Figure 1C:
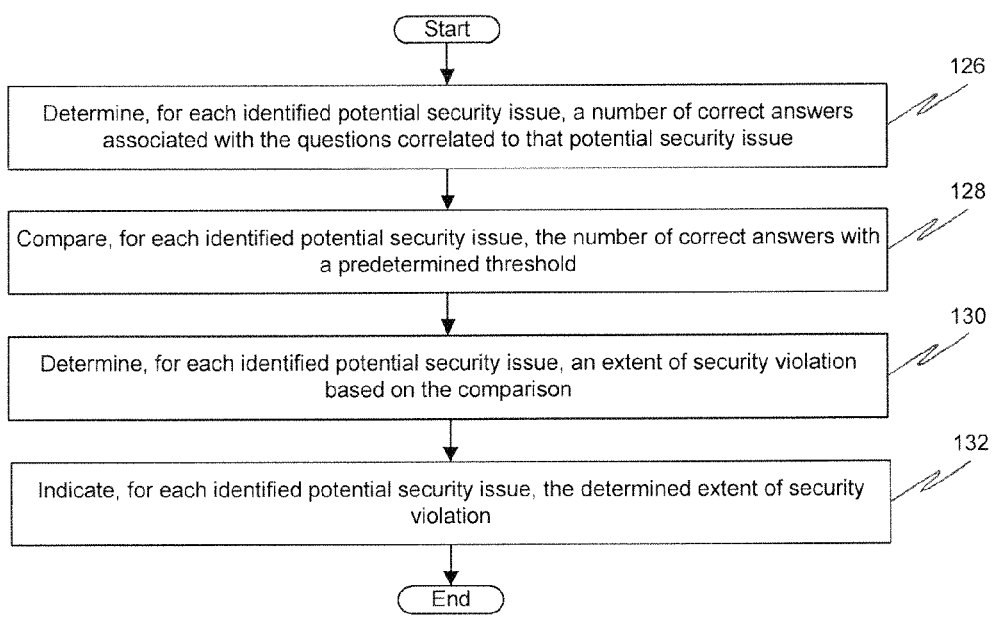

An exemplary flowchart for conducting a security audit session with one or more audit participants will now be described in conjunction with FIG. 1B. It should be apparent, however, that a method of performing an audit session is not limited to this example and may include various nuances of performing the audit session. In step 120, the processor may provide a randomly selected set of questions from a core question set and a randomly selected set of questions from a functional question set to each audit participant. The selection of these questions may be performed as explained in the context of FIG. 1. In some embodiments, the questions may be overlapped among various sets that are provided to audit participants as discussed in the context of FIG. 1. The selected sets of question both from the core question set and the functional question set may be provided to each audit participant in a sequence by means of a computer based examination. Alternately, the questions may be provided through a web based interview with an interviewer.

Further, in step 122, the processor may receive, from the audit participants, answers to each of the questions provided to the audit participants. An audit participant may provide an answer to each question. In some embodiments, there may be more than one correct answer to a question and thus, an audit participant may be allowed to provide more than one answer to a question. In some embodiments, each audit participant may be required to answer all the questions. In some embodiments, however, an audit participant may be allowed to leave a question unanswered if the audit participant is not aware of a correct answer to that question.

Once the processor receives the answers to all the questions from each audit participant, the processor may generate a security compliance report based on the received answers, in step 124. In some embodiments, this may include evaluating the received answers against a set of correct answers to the provided questions and determining the number of questions that were correctly answered by each audit participant. The answers may be evaluated by the processor based on a comparison between a correct answer and a received answer for each question. In some embodiments, however, a human examiner may also evaluate the received answers. For example, if there is a subjectively answer to a question, a human examiner may be required to evaluate that answer.

Once all the answers are evaluated, the processor may determine the number of correct answers corresponding to each identified potential security issue. Further, the processor may indicate an extent of criticality of each issue in the security compliance report based on the number of correct answers corresponding to that issue. An exemplary method of generating the security compliance report in accordance with some embodiments will now be explained in conjunction with FIG. 1C below.

In step 126, a processor may determine, for each identified potential security issue, a number of correct answers associated with the questions correlated to that potential security issue. A received answer to a question may be determined to be correct by evaluating it against a known correct answer for that question and so on for all the questions.

Once the number of correct answers is determined for each identified potential security issue, the processor may compare this number with a predetermined threshold, in step 128. The threshold may be a number that is based on a design parameter or a security parameter determined by the software solutions customer and stored in the memory of the security audit apparatus. For example, based on security requirements or one or more security parameters, the threshold number may be determined to be 7, which indicates that the number of correct answers corresponding to a security issues is to be compared with 7. In some embodiments, however, the threshold may be percentage of a number of known correct answers for an identified potential security issues. For example, for an identified potential security issues, the number of known correct answers is 20 and the threshold may be 25%, i.e., 5.

Further, in step 130, the processor may determine, for each identified potential security issue, an extent of security violation based on the comparison. In keeping with the previous example, the processor may determine that the number of the received correct answers corresponding to the identified potential security issue is below 25% (i.e., 5). In this case, the processor may conclude that the identified potential security issue is a major compliance issue. However, had the received number of correct answers been more than 5, the processor could have concluded that the identified potential security issue is a minor compliance issue.

In step 132, the processor may indicate in the security compliance report, an extent of security violation for all the identified potential security issues. This may include indicating, for all the identified potential security issues, whether each identified potential security issue is a major compliance issue or a minor compliance issue. It should be apparent, however, that the security compliance report is not limited to discussed nuance and may also indicate a percentage violation for each identified potential security issue. In some embodiments, the processor may further categorize all the identified potential security issues as high priority issues and low priority issues. The identified potential security issues that are determined to be a major compliance issue may be included in the high priority security issues and the identified potential security issues that are determined to be a minor compliance issue may be included in the low priority security issues in the security compliance report.

Figure 3:
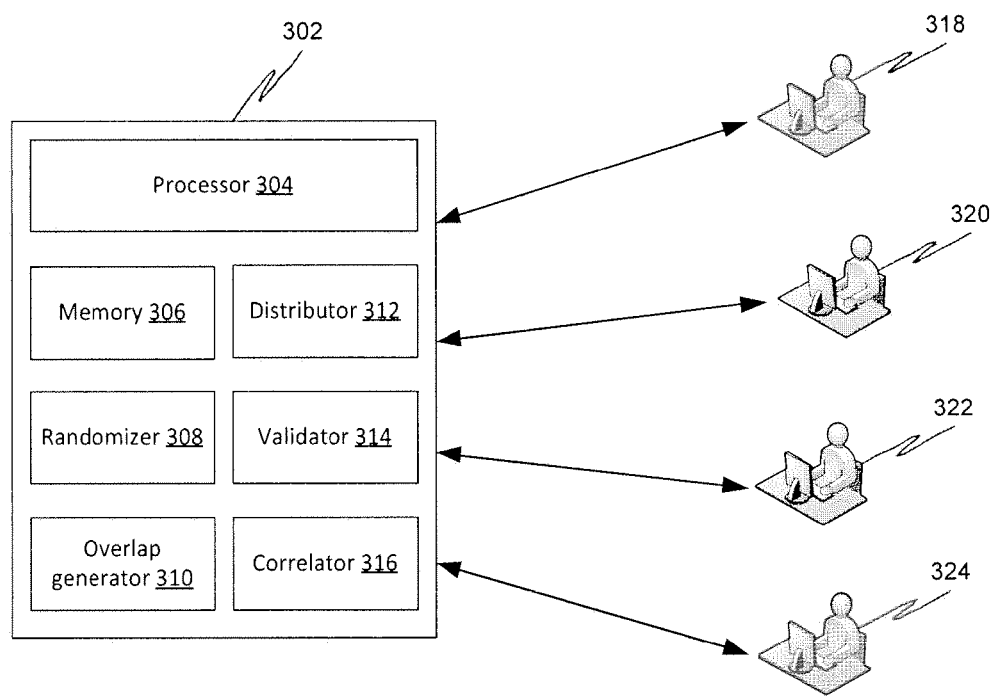
FIG. 3 illustrates an environment block diagram for performing a software security audit in accordance with some embodiments.

FIG. 3 illustrates an environment block diagram for performing a software security audit in accordance with the embodiments of this disclosure. FIG. 3 includes a software security apparatus 302. Software security apparatus 302 may include a processor 304, a memory 306, a randomizer 308, an overlap generator 310, a distributor 312, a validator 314, and a correlator 316. In some embodiments, memory 306 may include a plurality of instructions, which when executed by processor 304 cause the processor to perform the software security audit for an executable code. Processor 304 may perform all the steps involved in performing the software security audit. In some embodiments, however, processor 304 may outsource one or more steps to other processing entities that are in communication with security audit apparatus 302. These processing entities may be hardware or software or a combination of both and may be used to perform various processing operations associated with performing the software security audit.

In some embodiments, processor 304 may receive an executable code and a plurality of life-cycle artifacts associated with the executable code. Further, processor 304 may perform a security assessment on the executable code and the life-cycle artifacts to identify one or more potential security issues associated with the executable code. Based on the security assessment on the executable code, the one or more potential security issues are identified by processor 304. In some embodiments, processor 304 may provide a list of identified potential security issues to a correlator 316. On receiving the identified potential security issues, correlator 316 may correlate each identified potential security issue with one or more questions from a plurality of questions stored in a repository which is a standard library of security related questions, for example. Correlator 316 may then provide the questions correlated to each of the identified potential security issues to processor 304. On receiving the correlated questions, processor 304 may aggregate the questions correlated to all the identified potential security issues to create a first set of questions. The first set of questions may then be stored in memory 306 of security audit apparatus 302.

In some embodiments, processor 304 may obtain a requirements specification from the life-cycle artifacts associated with the executable code. On obtaining the requirements specification, processor 304 may determine a second set of questions based on the requirements specification and store this set of questions in memory 306.

In some embodiments, randomizer 308 may generate one or more random numbers and provide the random numbers to processor 304. On receiving the random numbers, processor 304 may randomly select one or more sets of question from each of the first set of questions and the second set of questions. In some embodiments, an overlap generator 310 in communication with processor 304 may determine an overlap between two or more randomly selected sets of question. Overlap generator 310 may determine that one or more questions need to be repeated in two or more sets of questions and may indicate this determination to processor 304. Processor 304, based on this indication from overlap generator 310, may then overlap one or more questions among various randomly selected sets while randomly selecting the sets of questions.

Further, processor 304 may provide all the randomly selected sets of questions to distributor 312. Distributor 312, on receiving the randomly selected sets of questions, may provide one randomly selected set to each of the audit participants such as audit participant 318, audit participant 320, audit participant 322, and audit participant 324. Validator 314 may then receive answers to the provided questions from the audit participants and evaluate the answers against a set of known correct answers to the provided questions. On evaluating the answers, validator 314 may generate a security compliance report that indicates an extent of security violation for each of the identified potential security issues. A few extensions of evaluating the answers are provided below for illustrative purposes.

First extension: The current invention utilizes a binary answer rating questions, which can easily be extended to a multi-level response structure i.e., this embodiment is able to handle questions that have more than two response selections. The system and method for non-binary answer elections can be applied for security questions and/or the functional questions or preferably both. With the binary responses, the scoring is either a 1 (=full score, for correct answer) or a 0 (=no score, for incorrect answer). However, with multi-level answers, some responses may carry a full score (=1), while some other responses may carry partial score (e.g., 0.75 for a 75% correct answer or 0.30 for a 30% correct answer). The correctness levels, with each answer choice may be pre-determined in this scenario.

Second extension: Another extension of the current disclosure is a system wherein there is a separate Assessment Module that is responsible for generating the score. In the current disclosure, we presumed that the degree of correctness, i.e., score for each response is pre-determined and provided along with the question and answers. Therefore, the function of the Assessment Module was a mere summation of the scores that are already pre-assigned with each response. In the extension of this disclosure, the Assessment Module is a separate function and it computes the percentage correctness level of the responses on its own, instead of looking up a predetermined table. The Assessment Module may use natural language processing of the responses, or similar other Artificial Intelligence technique. Its overall capability is to determine, for each response of a question, the degree or percentage correctness level of the said response. Once and after the correctness level is determined, adding them up generates the final score, which is similar to the step undertaken in the current disclosure. The key difference using the Assessment Module is the method of automatically generating the individual response specific score, instead of the said score being pre-determined and provided by the questions repository.

Third extension: This approach implements a feedback loop from the end security compliance output (to be determined later) back to the input question & answer stage. The idea is described as follows. Once and after the first iteration of security compliance report is generated, for each security issue deemed compliance breached upon—the said security issue is taken to a next level of detail. At the previous iteration, the questions (and responses) that were asked regarding assessment of this particular security issue may have been at the level of a basic overview. Once and after this particular security issue is determined to be of compliance significance, a further drill down step may be appropriate. In the further drill down step, the same security issue is iterated for a level-2 drill down with questions (and, responses) that match the level of "Intermediate". The goal behind further drill down questions is to pin point the compliance issues at greater depth. If the same security issue is again flagged as compliance violation then an additional iteration of questions' evaluation may be executed, wherein the questions will reflect "Advanced & Expert" level of knowledge. This repetitive questions and answer session may continue for an arbitrary number of iterations in theory, but in principle, the number of iterations may terminate at 3—reflecting the knowledge depth into three categories: Basic, Intermediate and Advanced. Finally, if a particular security issue is flagged as a violation at a previous iteration but cleared out as not a violation at the next higher iteration, then the security issue is taken out of the compliance violation list altogether, reflecting the logic that a code developer who can pass the more advanced level knowledge test is also likely to pass the more basic level knowledge test.

Fourth extension: In this approach, the SDLC artifacts from black-box testing or penetration testing phase are further utilized. Most commercial penetration testing tools are able to provide the name of the library and/or the code module in which the pen testing detected defects are identified. Sometimes line numbers may also be output. With the knowledge of the pen testing report, it is possible to further zoom down a specific security issue to identified components of the source code, file name and even line numbers. The idea behind this extension is to capitalize such detail information and identify the specific developer who might be responsible for developing the respective code segments. Upon identifying the specific developer(s), the security issue related Q&A may be further narrowed to the same developers, instead of the wider pool of developers. The rationale behind such approach, or the benefits therein, include a more focused attention to the developers who specifically authored the said security defective code segments, instead of generic to all developers.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed:

1. A method for performing security audit for an executable code, the method comprising:
    receiving, by a hardware processor, the executable code along with a plurality of lifecycle artifacts associated with the executable code;
    performing a security assessment on the executable code and the plurality of life-cycle artifacts associated with the executable code to identify one or more potential security issues associated with the executable code;
    determining a first set of questions based on the identified one or more security issues associated with the executable code;

determining a second set of questions based on a requirements specification associated with the executable code; and performing a security audit session with one or more audit participants based on the first set of questions and the second set of questions generating a security compliance report, comprising:
determining, for each of the identified one or more potential security issues, a number of correct answers associated with one or more questions correlated to the potential security issue;
comparing, for each of the one or more identified potential security issues, the number of correct answers with a predetermined threshold;
determining, for each of the one or more identified potential security issues, an extent of security violation based on the comparison; and
indicating, for each of the one or more identified potential security issues, the determined extent of security violation.

2. The method of claim 1, wherein performing the security assessment on the executable code and the plurality of life-cycle artifacts comprises performing one or more of a security requirements analysis, threat modeling, security unit testing, penetration testing, and/or user acceptance testing on the executable code and the plurality of life-cycle artifacts associated with the executable code.

3. The method of claim 1, wherein determining the first set of questions based on the identified one or more security issues associated with the software executable file comprises:
correlating each of the one or more identified potential security issues with one or more questions from a plurality of stored questions; and
aggregating, for each of the one or more identified potential security issues, the correlated one or more questions to form the first set of questions.

4. The method of claim 1, wherein performing a security audit session with one or more audit participants based on the first set of questions and the second set of questions further comprises:
selecting randomly, one or more sets of questions from the first set of questions and one or more sets of questions from the second set of questions;
providing a randomly selected set of questions from the first set of questions and a randomly selected set of questions from the second set of questions to each of the one or more audit participants; and
receiving an answer associated with each of the provided questions from each of the one or more audit participants.

5. The method of claim 1, further comprising categorizing the one or more potential security issues into high priority potential security issues and low priority security issues based on the security report.

6. A security audit apparatus for performing security audit for an executable code, the apparatus comprising:
at least one hardware processor; and
a memory comprising instructions executable by the at least one hardware processor, the instructions when executed, cause the at least one hardware processor to:
receive the executable code along with a plurality of life-cycle artifacts associated with the executable code;
perform a security assessment on the executable code and the plurality of life-cycle artifacts associated with the executable code to identify one or more potential security issues associated with the executable code;
determine a first set of questions based on the identified one or more security issues associated with the executable code;
determine a second set of questions based on a requirements specification associated with the executable code; and
perform a security audit session with one or more audit participants based on the first set of questions and the second set of questions
generate a security compliance report, comprising:
determine, for each of the identified one or more potential security issues, a number of correct answers associated with one or more questions correlated to the potential security issue;
compare, for each of the one or more identified potential security issues, the number of correct answers with a predetermined threshold;
determine, for each of the one or more identified potential security issues, an extent of security violation based on the comparison; and
indicate, for each of the one or more identified potential security issues, the determined extent of security violation.

7. The apparatus of claim 6, wherein the instructions further cause the at least one hardware processor to perform one or more of a security requirements analysis, threat modeling, security unit testing, penetration testing, and/or user acceptance testing on the executable code and the plurality of life-cycle artifacts associated with the executable code.

8. The apparatus of claim 6, the wherein the instructions further cause the at least one hardware processor to:
correlate each of the one or more identified potential security issues with one or more questions from a plurality of stored questions; and
aggregate, for each of the one or more identified potential security issues, the correlated one or more questions to form the first set of questions.

9. The apparatus of claim 6, wherein the instructions further cause the at least one hardware processor to:
select randomly, one or more sets of questions from the first set of questions and one or more sets of questions from the second set of questions;
provide a randomly selected set of questions from the first set of questions and a randomly selected set of questions from the second set of questions to each of the one or more audit participants; and
receive an answer associated with each of the provided questions from each of the one or more audit participants.

10. The apparatus of claim 6, wherein the instructions further cause the at least one hardware processor to categorize the one or more potential security issues into high priority potential security issues and low priority security issues based on the security report.

11. A non-transitory computer readable medium storing computer executable instructions thereon, which when executed by a hardware processor, cause the hardware processor to perform operations comprising:
receiving, by a hardware processor, an executable code along with a plurality of lifecycle artifacts associated with the executable code;
performing a security assessment on the executable code and the plurality of life-cycle artifacts associated with the executable code to identify one or more potential security issues associated with the executable code;

determining a first set of questions based on the identified one or more security issues associated with the executable code;

determining a second set of questions based on a requirements specification associated with the executable code; and performing a security audit session with one or more audit participants based on the first set of questions and the second set of questions generating a security compliance report, comprising:
- determining, for each of the identified one or more potential security issues, a number of correct answers associated with one or more questions correlated to the potential security issue;
- comparing, for each of the one or more identified potential security issues, the number of correct answers with a predetermined threshold;
- determining, for each of the one or more identified potential security issues, an extent of security violation based on the comparison; and
- indicating, for each of the one or more identified potential security issues, the determined extent of security violation.

12. The medium of claim 11, wherein performing the security assessment on the executable code and the plurality of life-cycle artifacts comprises performing one or more of a security requirements analysis, threat modeling, security unit testing, penetration testing, and/or user acceptance testing on the executable code and the plurality of life-cycle artifacts associated with the executable code.

13. The medium of claim 11, wherein determining the first set of questions based on the identified one or more security issues associated with the software executable file comprises:
- correlating each of the one or more identified potential security issues with one or more questions from a plurality of stored questions; and
- aggregating, for each of the one or more identified potential security issues, the correlated one or more questions to form the first set of questions.

14. The medium of claim 11, wherein establishing the security audit session with the one or more audit participants based on the first set of questions and the second set of questions comprises:
- selecting randomly, one or more sets of questions from the first set of questions and one or more sets of questions from the second set of questions;
- providing a randomly selected set of questions from the first set of questions and a randomly selected set of questions from the second set of questions to each of the one or more audit participants; and
- receiving an answer associated with each of the provided questions from each of the one or more audit participants.

15. The medium of claim 11, further comprising categorizing the one or more potential security issues into high priority potential security issues and low priority security issues based on the security report.

* * * * *